(12) United States Patent
Harasawa et al.

(10) Patent No.: US 12,337,522 B2
(45) Date of Patent: Jun. 24, 2025

(54) PANEL MANUFACTURING METHOD

(71) Applicant: KYORAKU CO., LTD., Kyoto (JP)

(72) Inventors: Yuki Harasawa, Yamato (JP); Sho Nakajima, Yamato (JP); Ryuichi Ishida, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 108 days.

(21) Appl. No.: 18/251,267

(22) PCT Filed: Nov. 24, 2021

(86) PCT No.: PCT/JP2021/042984
§ 371 (c)(1),
(2) Date: May 1, 2023

(87) PCT Pub. No.: WO2022/113999
PCT Pub. Date: Jun. 2, 2022

(65) Prior Publication Data
US 2023/0405912 A1    Dec. 21, 2023

(30) Foreign Application Priority Data
Nov. 27, 2020  (JP) .................................. 2020-197403

(51) Int. Cl.
*B29C 51/12*   (2006.01)
*B29C 51/26*   (2006.01)
(Continued)

(52) U.S. Cl.
CPC .............. *B29C 51/12* (2013.01); *B29C 51/26* (2013.01); *B60R 5/04* (2013.01); *E05D 1/02* (2013.01)

(58) Field of Classification Search
CPC .. E05D 1/00; E05D 1/02; B29C 51/00; B29C 51/08; B29C 51/082; B29C 43/021;
(Continued)

(56) References Cited

U.S. PATENT DOCUMENTS 4,966,283 A * 10/1990 Sykes ..................... B29C 51/00
                                                    206/311
5,776,388 A *  7/1998 Andersen ................. B32B 9/00
                                                    264/129
(Continued)

FOREIGN PATENT DOCUMENTS

JP   H01-209130 A   8/1989
JP   2002-046168 A  2/2002
(Continued)

OTHER PUBLICATIONS

International Search Report issued on Jan. 25, 2022, in corresponding International Application No. PCT/JP2021/042984; 4 pages.

*Primary Examiner* — Andrew L Swanson
(74) *Attorney, Agent, or Firm* — Maier & Maier, PLLC

(57) ABSTRACT

The present invention provides a method for manufacturing a panel by which the formation of a blister-shaped inflation portion at the boundary between an intermediate portion and a hinge can be suppressed, even when the size of the intermediate portion is small. According to the present invention, provided is a method for manufacturing a panel, wherein the panel comprises first and second main body portions, and a hinge portion, the hinge portion comprises first and second hinges extending in parallel and an intermediate portion arranged therebetween, the first main body portion and the intermediate portion are connected by the first hinge so as to be able to pivot relative to each other, the second main body portion and the intermediate portion are connected by the second hinge so as to be able to pivot relative to each other.

2 Claims, 11 Drawing Sheets

(51) Int. Cl.
*B60R 5/04* (2006.01)
*E05D 1/02* (2006.01)

(58) Field of Classification Search
CPC ........ B29C 2043/022; B29C 2043/023; B29C 53/06; B29C 37/0057; B29C 70/42; B29C 43/18; B29C 48/07; B29C 48/08; B29C 51/105; B29C 51/306; B65D 1/22; B65D 1/225; B65D 1/24; B65D 1/28; B65D 5/08; B29L 2031/22
See application file for complete search history.

(56) References Cited

U.S. PATENT DOCUMENTS

| | | | |
|---|---|---|---|
| 5,843,544 A * | 12/1998 | Andersen | B32B 5/14 |
| | | | 16/385 |
| 2012/0100337 A1* | 4/2012 | Suzuki | B32B 3/28 |
| | | | 428/116 |
| 2014/0205809 A1* | 7/2014 | Ishii | B32B 27/20 |
| | | | 428/161 |
| 2015/0086759 A1 | 3/2015 | Sumi et al. | |
| 2018/0079164 A1 | 3/2018 | Sumi et al. | |
| 2021/0180377 A1* | 6/2021 | Ishii | B29C 51/105 |

FOREIGN PATENT DOCUMENTS

| | | | | |
|---|---|---|---|---|
| JP | 2013-103422 A | | 5/2013 | |
| JP | 2019130905 A | * | 8/2019 | .......... B29C 33/005 |
| JP | 2020-179528 A | | 11/2020 | |
| WO | 2013/077198 A1 | | 5/2013 | |
| WO | 2019/151213 A1 | | 8/2019 | |

* cited by examiner

PANEL MANUFACTURING METHOD

TECHNICAL FIELD

The present invention relates to a panel that can be used as a bath lid, a floorboard installed in a luggage compartment of a vehicle and the like.

BACKGROUND ART

Patent Literature 1 discloses a panel in which an intermediate portion (supporting body) having a hollow double-walled structure is provided between a pair of hinges. Such a panel can be folded at the hinges.

CITATION LIST

Patent Literature

Patent Literature 1: JP-A-2002-46168
Patent Literature 2: WO2013/077198

SUMMARY OF INVENTION

Technical Problem

Although the panel of Patent Literature 1 can be formed by vacuum forming using a pair of resin sheets as disclosed in Patent Literature 2, pressurized air may remain in a closed space of the intermediate portion in such a case. If the pressurized air remains in this portion, a blister-shaped inflation portion may be formed at the boundary between the intermediate portion and the hinge.

To avoid such a problem, a possible measure is to pierce the intermediate portion with a hollow pin during molding so that the pressurized air does not remain in the closed space of the intermediate portion. However, when the size of the intermediate portion is small, it is not easy to pierce it with the hollow pin, and thus it is difficult to take such a measure.

The present invention has been made in view of such circumstances and aims to provide a method for manufacturing a panel by which the formation of a blister-shaped inflation portion at the boundary between the intermediate portion and the hinge can be suppressed, even when the size of the intermediate portion is small.

Solution to Problem

According to the present invention, provided is a method for manufacturing a panel, wherein the panel comprises first and second main body portions and a hinge portion, the hinge portion comprises first and second hinges extending in parallel and an intermediate portion arranged therebetween, the first main body portion and the intermediate portion are connected by the first hinge so as to be able to pivot relative to each other, the second main body portion and the intermediate portion are connected by the second hinge so as to be able to pivot relative to each other, the method comprises an extrusion step, a shaping step, an insertion step, and a mold closing step, in the extrusion step, first and second resin sheets are extruded between first and second molds, the second resin sheet is arranged between the first resin sheet and the second mold, in the shaping step, the first and second resin sheets are shaped along a cavity surface of the first and second molds, respectively, in the insertion step, a foamed body is arranged between the first and second resin sheets, in the mold closing step, the first and second molds are closed, the second mold comprises a ridge for forming the hinge portion, a tip of the ridge is provided with first and second projections corresponding to the first and second hinges, and a groove corresponding to the intermediate portion and arranged between the first and second projections, in the mold closing step, the hinge portion is formed by sandwiching and compressing the first and second resin sheets and the foamed body between the tip of the ridge and the first mold, and a value of Dg/Ts2 is 1.5 to 3, where Dg represents a depth of the groove, and Ts2 represents a thickness of the second resin sheet.

As a result of intensive studies by the present inventors, they found that, when the hinge portion comprising the first and second hinges and the intermediate portion arranged therebetween is formed by sandwiching and the foamed body between the first and second resin sheets and compressing them, the formation of the inflation portion at the boundary between the intermediate portion and the hinge can be suppressed even without piercing the intermediate portion with a hollow pin, and then completed the present invention. It is believed that the formation of the inflation portion is suppressed because air can easily escape through the foamed body during molding and the pressurized air is suppressed from remaining in the intermediate portion.

Hereinafter, various embodiments of the present invention will be exemplified. The embodiment shown below can be combined with each other.

Preferably, in the above-described method, a value of Tc/Ts2 is 2 to 6, where Tc represents a thickness of the foamed body at a portion facing the ridge.

Preferably, in the above-described method, a value of Wg/Dg is 2.5 to 4, where Wg represents a width of the groove.

DESCRIPTION OF EMBODIMENTS

Figure 1B:
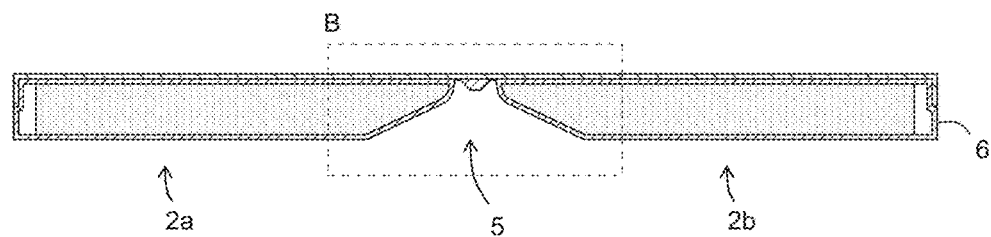
FIG. 1B is a cross-sectional view taken along a C-C line in FIG. 1A.
Figure 1A:
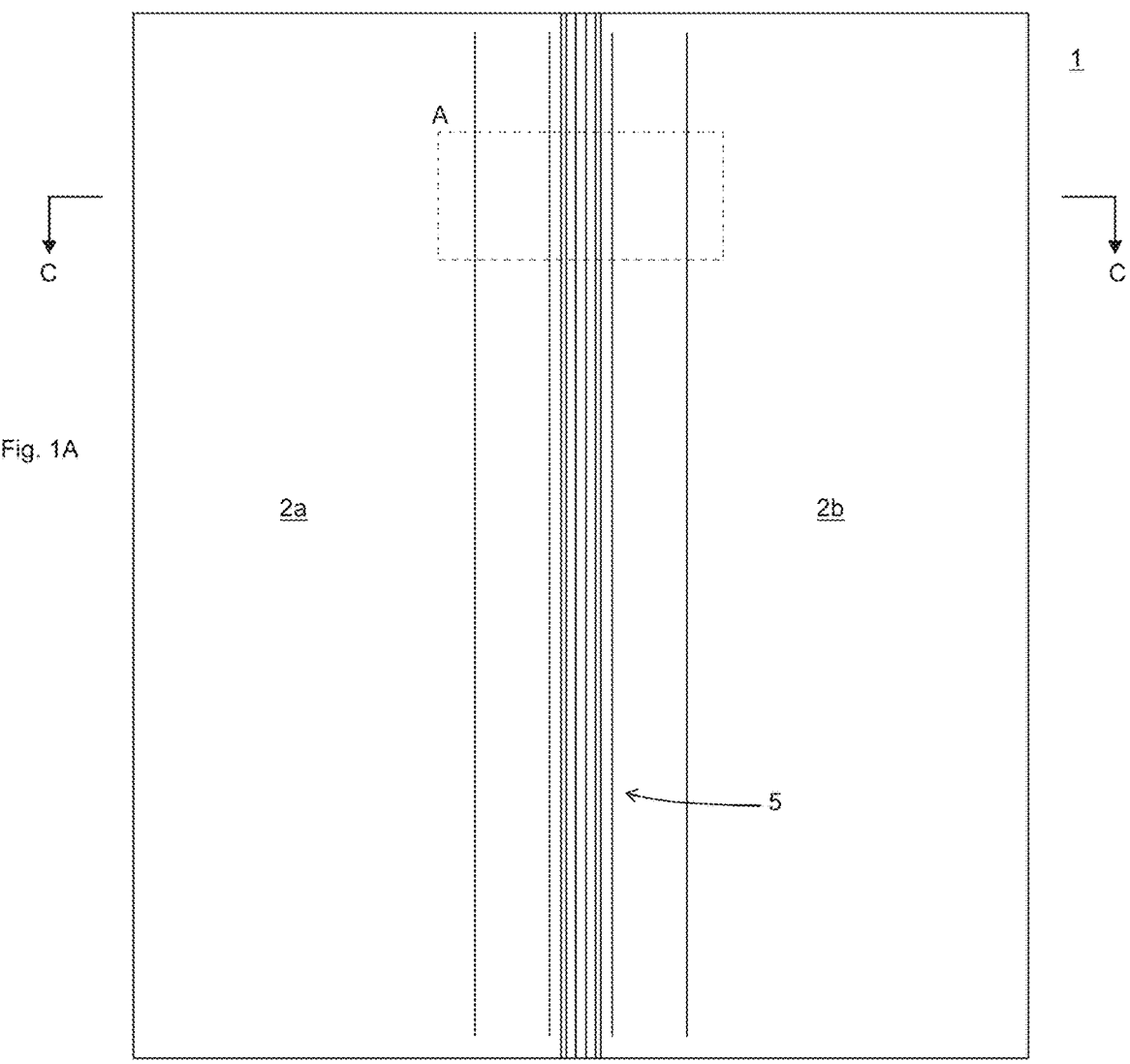
FIG. 1A is a back view of a panel 1.
Figure 2B:
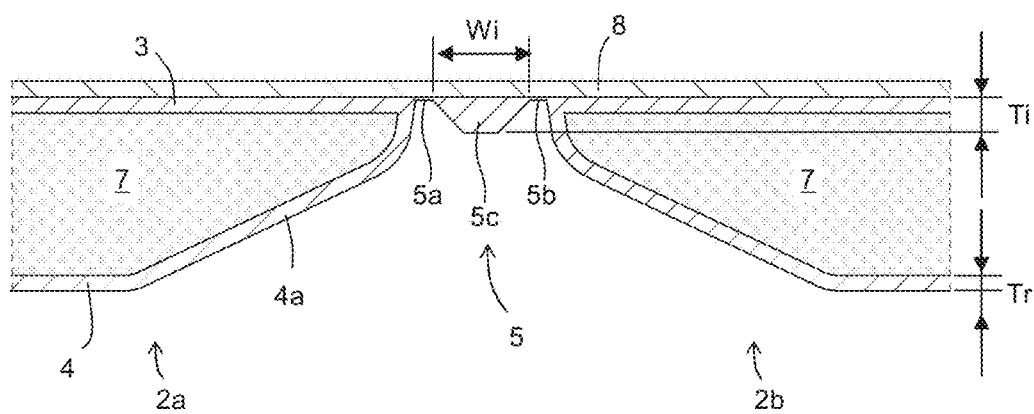
FIG. 2B is an enlarged view of a region B in FIG. 1B.
Figure 2A:
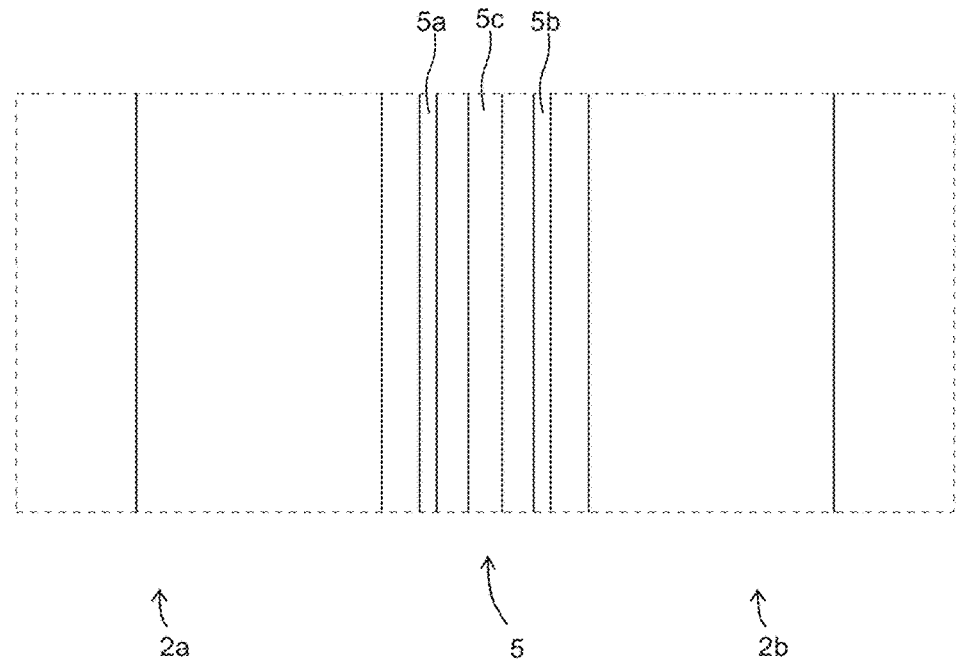
FIG. 2A is an enlarged view of a region A in FIG. 1A.

Hereinafter, embodiments of the present invention will be described. Various characteristics in the embodiments described below can be combined with each other. Further, the invention is independently established for each characteristic.

1. Panel 1

First, a panel 1 that can be manufactured by a panel manufacturing method of one embodiment of the present invention will be described. As shown in FIG. 1A to FIG. 2B, the panel 1 comprises first and second main body portions 2a, 2b and a hinge portion 5.

The main body portions 2a, 2b are panel-shaped molded bodies. The panel 1 comprises a front wall 3 and a back wall 4. The front wall 3 and the back wall 4 are spaced apart and facing each other. The peripheries of the front wall 3 and the back wall 4 are connected to each other by a peripheral wall 6.

The surface of the front wall 3 is flat. The hinge portion 5 is formed by recessing the back wall 4 toward the front wall 3. The back wall 4 is provided with an inclined portion 4a at a position adjacent to the hinge portion 5, and the distance between the front wall 3 and the back wall 4 decreases at the inclined portion 4a toward the hinge portion 5.

A skin material 8 is provided on a side of the front wall 3 of the panel 1. The skin material 8 is provided on the side of the front wall 3 of the panel 1, spanning the main body portion 2a, the hinge portion 5, and the main body portion 2b. The skin material 8 is preferably formed of a carpet-shaped member with air permeability, such as non-woven fabric, and is preferably molded integrally with the front wall 3 when the panel 1 is molded.

The thickness of the front wall 3 and the back wall 4 in the main body portions 2a, 2b is, for example, 0.5 to 2 mm, specifically, for example, 0.5, 1.0, 1.5, 2.0 mm, and may be in a range between any two of the numerical values exemplified herein.

A foamed body 7 is provided between the front wall 3 and the back wall 4. The foamed body 7 has a function of securing a space between the front wall 3 and the back wall 4 and increasing the strength and heat insulation of the panel 1.

The hinge portion 5 comprises first and second hinges 5a, 5b extending in parallel and an intermediate portion 5c arranged therebetween. The first main body portion 2a and the intermediate portion 5c are connected by the first hinge so as to be able to pivot relative to each other, and the second main body portion 2b and the intermediate portion 5c are connected by the second hinge 5b so as to be able to pivot relative to each other. Consequently, the main body portions 2a, 2b are connected by the hinge portion 5 so as to be able to pivot relative to each other.

The intermediate portion 5c has a substantially trapezoidal cross section, and the thickness of the intermediate portion 5c gradually decreases toward the widthwise end of the intermediate portion 5c. Therefore, the intermediate portion is smoothly connected to the hinges 5a, 5b.

The thickness of the hinges 5a, 5b is, for example, 0.001 to 0.5 mm, specifically, for example, 0.001, 0.01, 0.1, 0.2, 0.3, 0.4, 0.5 mm, and may be in a range between any two of the numerical values exemplified herein. The width of the hinges 5a, 5b is, for example, 0.5 to 3 mm, specifically, for example, 0.5, 1.0, 1.5, 2.0, 2.5, 3.0 mm, and may be in a range between any two of the numerical values exemplified herein.

Ti is 1.5 to 3 mm, where Ti represents the thickness of the intermediate portion 5c. Ti is specifically, for example, 1.5, 2.0, 2.5, 3.0 mm, and may be in a range between any two of the numerical values exemplified herein. Wi is, for example, 4 to 8 mm, where Wi represents the width of the intermediate portion 5c. Wi is specifically, for example, 4.0, 4.5, 5.0, 5.5, 6.0, 6.5, 7.0, 7.5, 8.0 mm and may be in a range between any two of the numerical values exemplified herein. Further, the value of Wi/Ti is, for example, 1.5 to 5, preferably, 2.5 to 4, specifically, for example, 1.5, 2.0, 2.5, 3.0, 3.5, 4.0, 4.5, 5.0 and may be in a range between any two of the numerical values exemplified herein.

The value of Ti/Tr is, for example, 1.5 to 3, where Tr represents the thickness of the back wall 4 in the main body portions 2a, 2b. Ti/Tr is specifically, for example, 1.5, 1.6, 1.7, 1.8, 1.9, 2.0, 2.1, 2.2, 2.3, 2.4, 2.5, 2.6, 2.7, 2.8, 2.9, 3.0 and may be in a range between any two of the numerical values exemplified herein.

In this regard, in the specification of the present application, the thickness of the hinges 5a, 5b and the intermediate portion 5c means the thickness not including the thickness of the skin material 8. Further, the value of the thickness and width and the like of the various members means an average value if not otherwise specified.

2. Molding Machine 10

Figure 3:
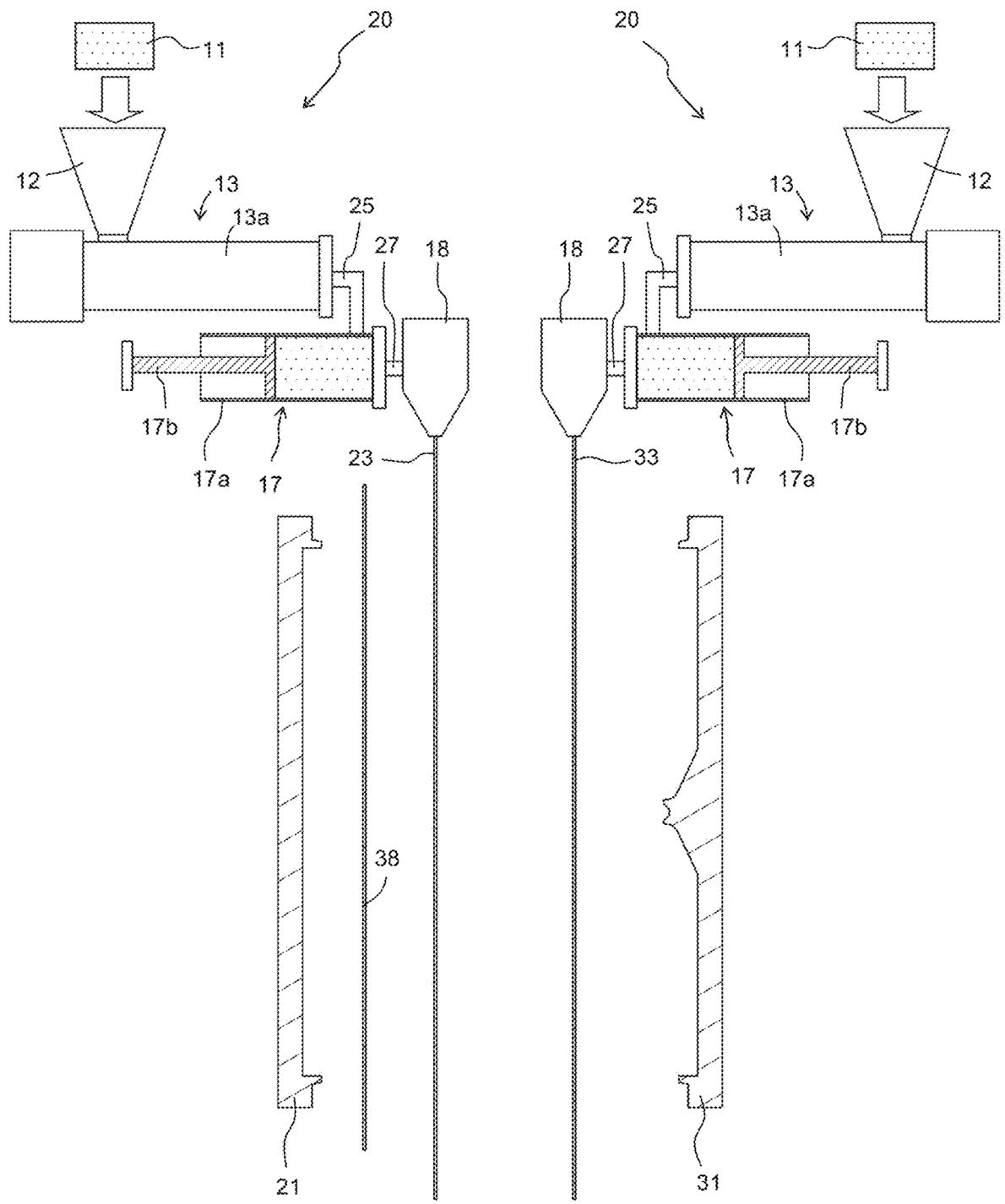
FIG. 3 is a configuration diagram (a vertical cross-sectional view for molds 21, 31 and members near them) of a molding machine 10 that can be used for manufacturing the panel 1.

Next, a molding machine 10 that can be used to implement a manufacturing method of the panel 1 will be described with reference to FIG. 3 to FIG. 5. The molding machine 10 comprises a pair of resin sheet forming devices 20 and first and second molds 21, 31. Each of the resin sheet forming devices 20 comprises a hopper 12, an extruder 13, an accumulator 17, and a T-die 18. The extruder 13 and the accumulator 17 are connected via a connecting pipe 25. The accumulator 17 and the T-die 18 are connected via a connecting pipe 27.

Hereinafter, the configuration of each component will be described.

<Hopper 12, Extruder 13>

The hopper 12 is used for charging raw resin 11 in a cylinder 13a of the extruder 13. Although the form of the raw resin 11 is not specifically limited, resin in the form of pellet is usually used. The raw resin 11 is, for example, a thermoplastic resin, such as polyolefin. Examples of the polyolefin include low-density polyethylene, linear low-density polyethylene, high-density polyethylene, polypropylene, ethylene-propylene copolymer, and a mixture thereof. The raw resin 11 is charged in the cylinder 13a from the hopper 12 and then melted into molten resin by being heated in the cylinder 13a. Further, the raw resin 11 is conveyed toward a distal end of the cylinder 13a by rotation of a screw arranged in the cylinder 13a. The screw is arranged in the cylinder 13a and kneads and conveys the molten resin by its rotation.

<Accumulator 17, T-Die 18>

The molten resin is extruded from a resin extruding outlet of the cylinder 13a and is injected into the accumulator 17 via the connecting pipe 25. The accumulator 17 is provided with a cylinder 17a and a piston 17b that is slidable within the cylinder 17a. The molten resin can be stored in the cylinder 17a. By moving the piston 17b after a predetermined amount of the molten resin is stored in the cylinder 17a, the molten resin is extruded from a slit provided in the T-die 18 via the connecting tube 27, thereby forming the first and second resin sheets 23, 33 in a molten state.

<Molds 21, 31>

The resin sheets 23, 33 are extruded between the molds 21, 31 in the state where the openable and closable molds 21, 31 are opened. As shown in FIG. 4, the molds 21, 31 have cavity surfaces 21a, 31a, and pinch-off portions 21b, 31b are provided so as to surround the cavity surfaces 21a, 31a, respectively. Reduced pressure suction holes (not shown) are provided on the cavity surfaces 21a, 31a, and the resin sheets 23, 33 are suctioned by reduced pressure via the reduced pressure suction holes, thereby being shaped into a shape along the cavity surfaces 21a, 31a. The thickness of the resin sheets 23, 33 is, for example, 0.5 to 2 mm, specifically, for example, 0.5, 1.0, 1.5, 2.0 mm, and may be in a range between any two of the numerical values exemplified herein.

The mold 31 is provided with a ridge 35 for forming the hinge portion 5. The ridge 35 is an elongated protrusion. The ridge 35 is preferably formed so that the longitudinal direction of the ridge 35 is non-parallel to the extrusion direction of the resin sheets 23, 33, and is more preferably formed so that the longitudinal direction of the ridge 35 is orthogonal to the extrusion direction of the resin sheets 23, 33. In such a case, variation in the thickness of the resin sheets 23, 33 along the longitudinal direction of the hinge portion 5 is suppressed.

Figure 5:
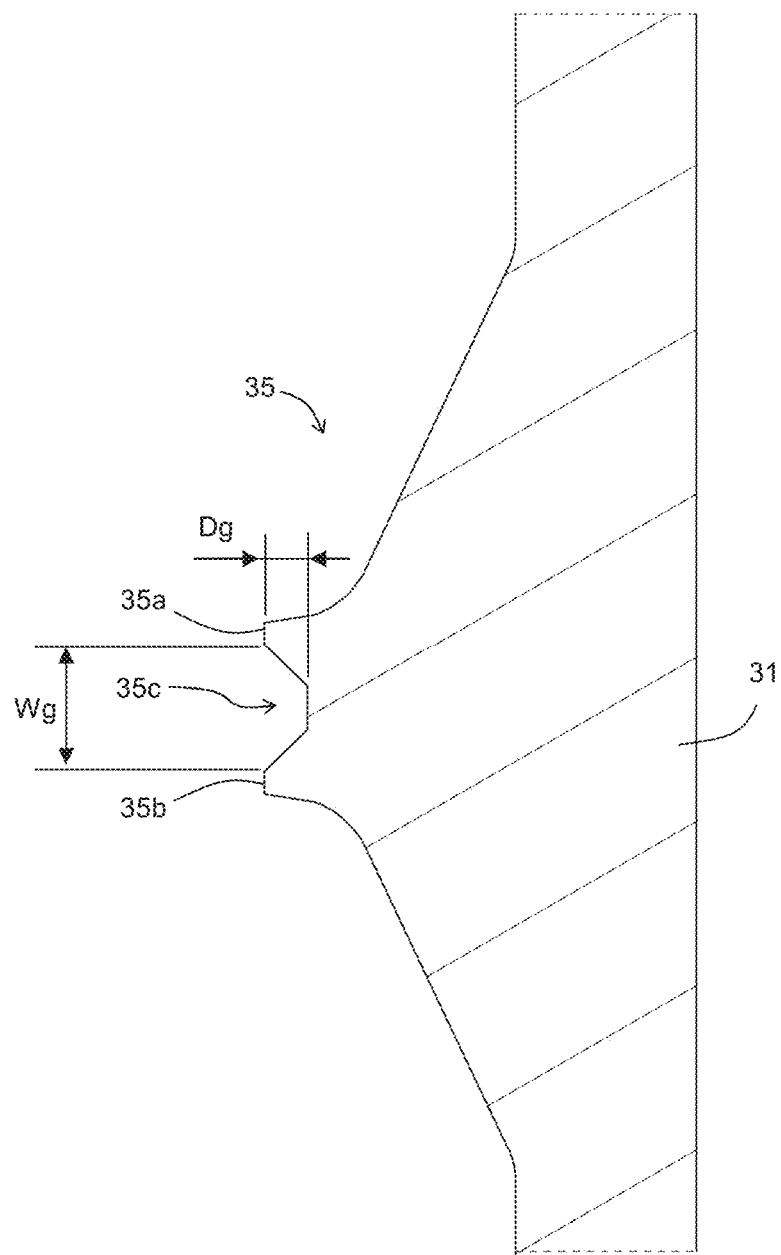
FIG. 5 is an enlarged view of a region A in FIG. 4.

As shown in FIG. 5, a tip of the ridge 35 is provided with first and second projections 35a, 35b corresponding to the hinges 5a, 5b, and a groove 35c corresponding to the intermediate portion 5c and arranged between projections 35b. The width of the projections 35a, 35b is, for example, 0.5 to 3 mm, specifically, for example, 0.5, 1.0, 1.5, 2.0, 2.5, 3.0 mm and may be in a range between any two of the numerical values exemplified herein.

The groove 35c has a substantially trapezoidal shape. Dg is 1.5 to 3 mm, where Dg represents the depth of the groove 35c. Dg is specifically, for example, 1.5, 2.0, 2.5, 3.0 mm, and may be in a range between any two of the numerical values exemplified herein. Wg is, for example, 4 to 8 mm, where Wg represents the width of the groove 35c. Wg is specifically, for example, 4.0, 4.5, 5.0, 5.5, 6.0, 6.5, 7.0, 7.5, 8.0 mm, and may be in a range between any two of the numerical values exemplified herein. Further, the value of Wg/Dg is, for example, 1.5 to 5, preferably, 2.5 to 4, specifically, for example, 1.5, 2.0, 2.5, 3.0, 3.5, 4.0, 4.5, 5.0, and may be in a range between any two of the numerical values exemplified herein.

The value of Dg/Ts2 is, for example, 1.5 to 3, where Ts2 represents the thickness of the resin sheet 33. Dg/Ts2 is specifically, for example, 1.5, 1.6, 1.7, 1.8, 1.9, 2.0, 2.1, 2.2, 2.3, 2.4, 2.5, 2.6, 2.7, 2.8, 2.9, 3.0, and may be in a range between any two of the numerical values exemplified herein.

3. Manufacturing Method of Panel 1

The manufacturing method of the panel 1 of one embodiment of the present invention will be described with reference to FIG. 4 to FIG. 9. The method of the present embodiment comprises an extrusion step, a shaping step, an insertion step, and a mold closing step. Hereinafter, each of the steps will be described.

(1) Extrusion Step

Figure 4:
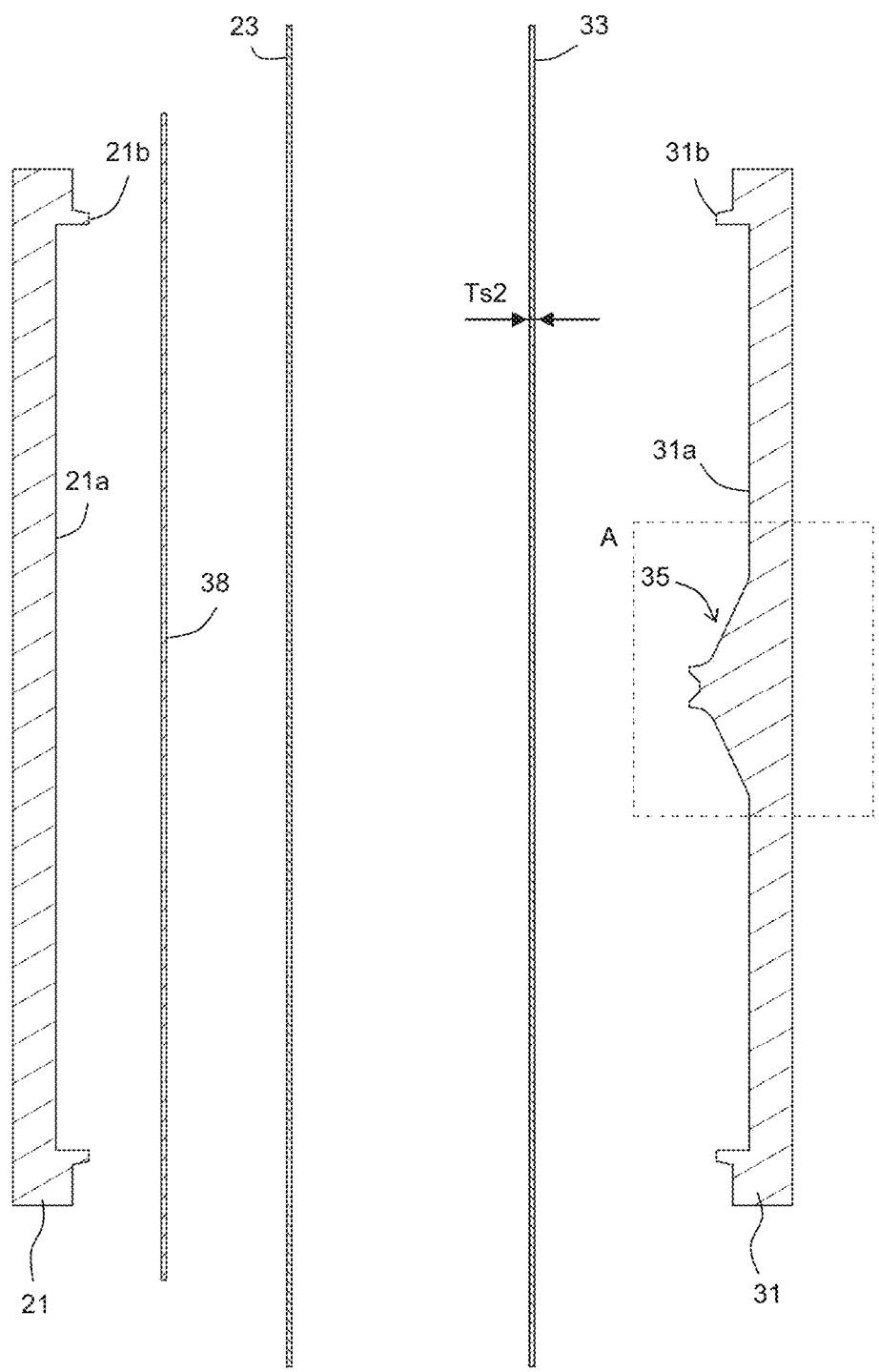
FIG. 4 is a cross-sectional view showing a state where resin sheets 23, 33 are extruded between the molds 21, 31.

In the extrusion step, as shown in FIG. 4, the resin sheets 23, 33 are extruded between the molds 21, 31. The resin sheet 33 is arranged between the resin sheet 23 and the mold 31. A skin material sheet 38 is arranged between the mold 21 and the resin sheet 23. The skin material sheet 38 can be omitted if unnecessary.

(2) Shaping Step

Figure 6:
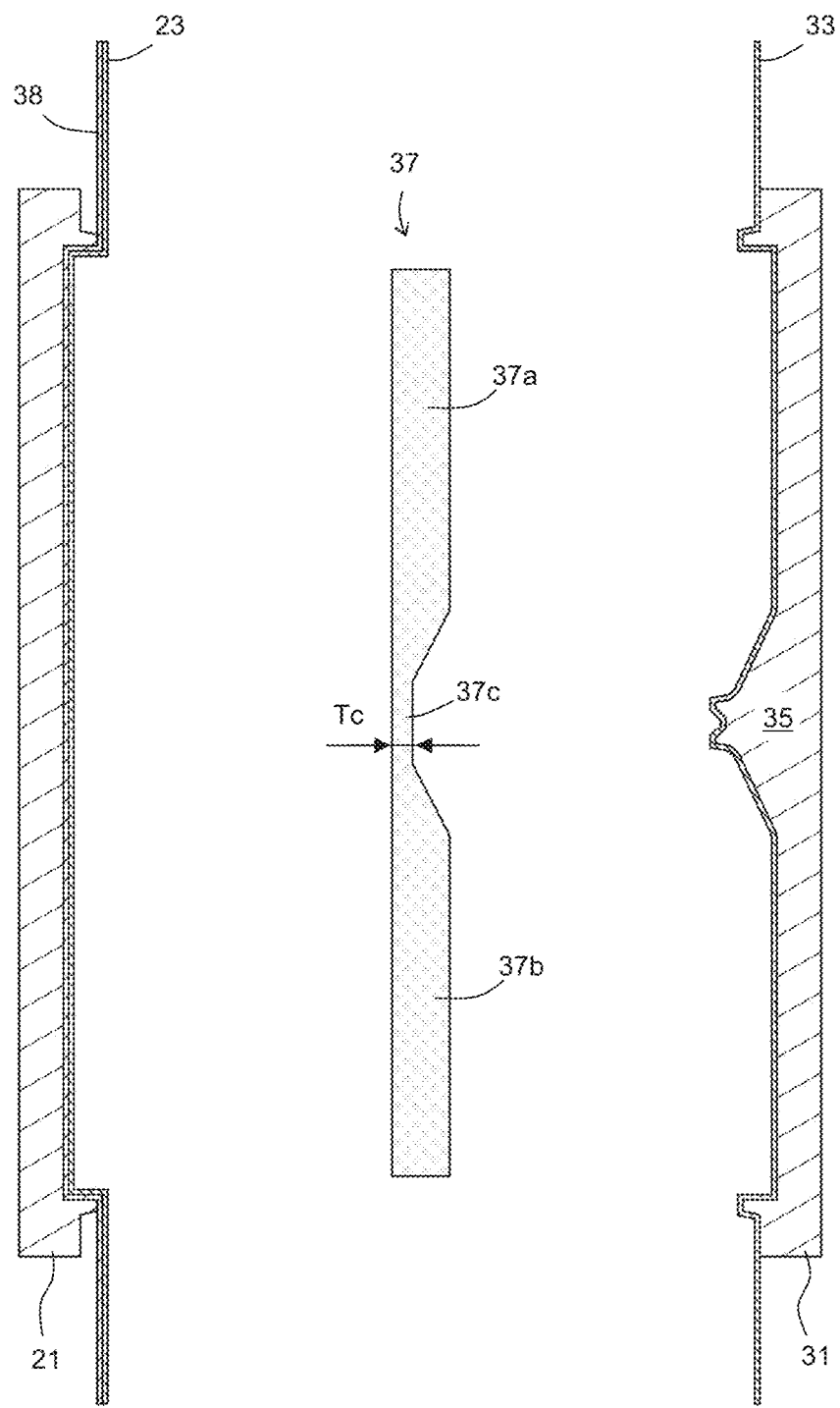
FIG. 6 is a cross-sectional view showing a state after the resin sheets 23,33 are shaped along a cavity inner surface of the molds 21, 31 from the state of FIG. 4.

In the shaping step, as shown in FIG. 6, the resin sheets 23, 33 are shaped along the cavity surfaces 21a, 31a of the molds 21, 31, respectively. This step can be implemented by suctioning the resin sheets 23, 33 by reduced pressure with the molds 21, 31. When the resin sheet 23 is shaped, the skin material sheet 38 is also shaped along the cavity surface 21a.

(3) Insertion Step

Figure 7:
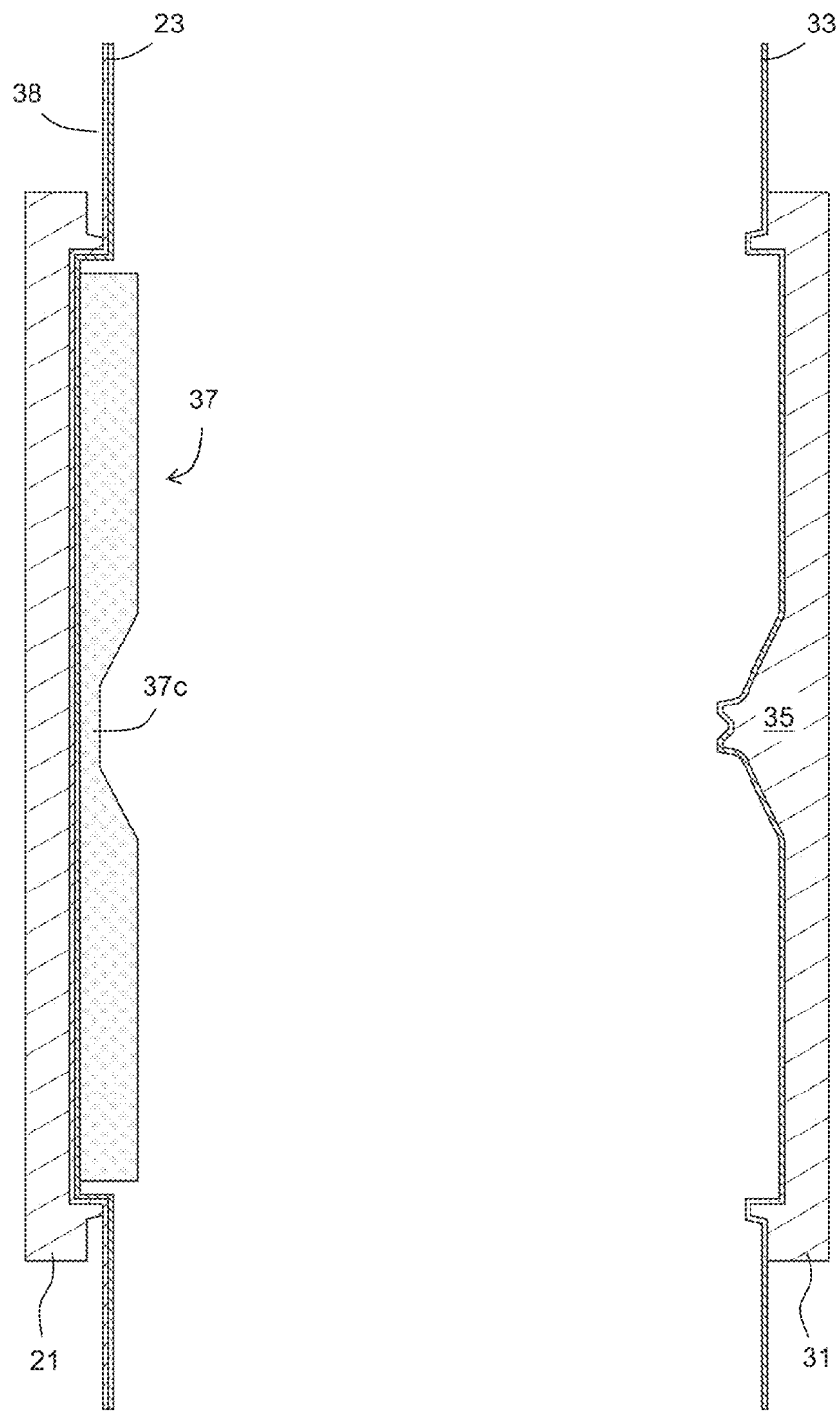
FIG. 7 is a cross-sectional view showing a state after a foamed body 37 is attached to the resin sheet 23 from the state of FIG. 6.

In the insertion step, as shown in FIG. 6 to FIG. 7, a foamed body 37 is arranged between the resin sheets 23, 33. Preferably, the foamed body 37 is welded to the resin sheet 23. The foamed body 37 is configured by connecting first and second main body portions 37a, 37b via a connection portion 37c. The main body portions 37a, 37b are respectively accommodated in the main body portions 2a, 2b of the panel 1. The connection portion 37c corresponds to the hinge portion 5. The foamed body 37 is arranged so that the connection portion 37c faces the ridge 35. Tc is, for example, 2 to 6 mm, where Tc represents the thickness of the connection portion 37c. Tc is specifically, for example, 2.0, 2.5, 3.0, 3.5, 4.0, 4.5, 5.5, 6.0 mm, and may be in a range between any two of the numerical values exemplified herein. Further, the value of Tc/Ts2 is, for example 2 to 6, specifically, for example, 2, 2.5, 3, 3.5, 4, 4.5, 5, 5.5, 6, and may be in a range between any two of the numerical values exemplified herein.

The expansion ratio of the foamed body 37 is, for example, 3 to 50 times and preferably 20 to 50 times. This expansion ratio is specifically, for example, 3, 10, 15, 20, 25, 30, 35, 40, 45, 50 times, and may be in a range between any two of the numerical values exemplified herein. Examples of material of the foamed body 37 include polyolefin, polystyrene, and alloys thereof.

(4) Mold Closing Step

In the mold closing step, the molds 21, 31 are closed.

Figure 8:
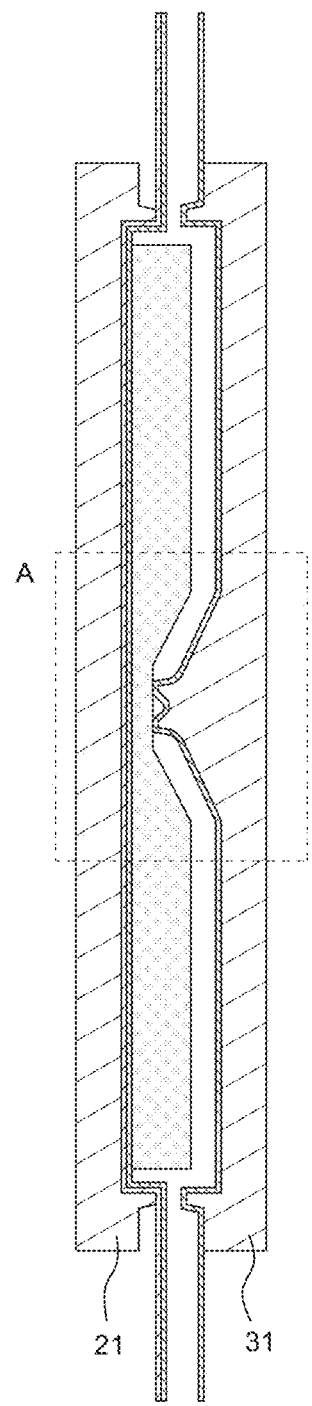
FIG. 8 shows a state in the middle of a mold closing step and immediately after portions 33a, 33b of the resin sheet 33 covering projections 35a, 35b come into contact with the foamed body 37.
Figure 9:
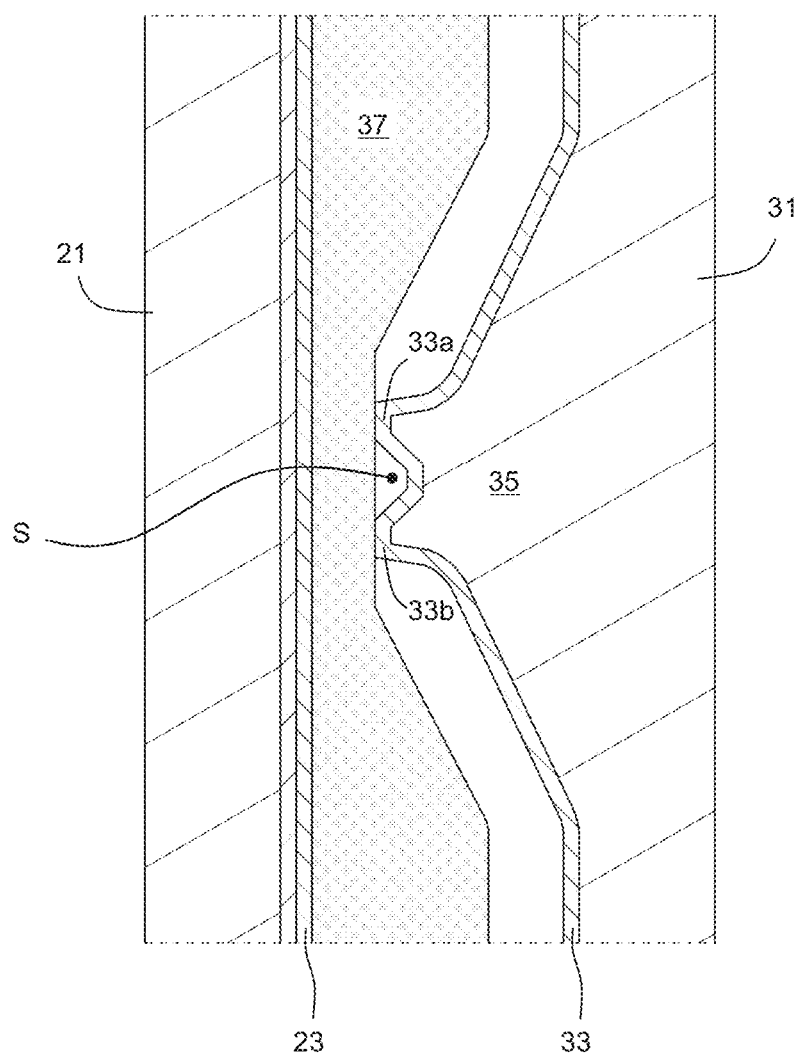
FIG. 9 is an enlarged view of a region A in FIG. 8.

FIG. 8 to FIG. 9 show a state in the middle of the mold closing step and immediately after portions 33a, 33b of the resin sheet 33 covering the projections 35b come into contact with the foamed body 37. At this point, a space surrounded by the resin sheet 33 and the foamed body 37 becomes a closed space S. When mold closing is further advanced in this state, a portion of the foamed body 37 facing the portions 33a, 33b are melted by the portions 33a, 33b, and a portion of the foamed body 37 facing the closed space S enters the closed space S to compress air in the closed space S. However, since the foamed body 37 has some air permeability, air in the closed space S can escape through the foamed body 37. Consequently, air in the closed space S is suppressed from being pressurized.

When the molds 21, 31 are further closed from the state of FIG. 8 to FIG. 9, the resin sheets 23, 33 are welded to each other along the pinch-off portions 21b, 31b, and the panel 1 in the shape along the inner surface of the cavity formed by a pair of molds 21, 31 is obtained. Between the ridge 35 and the mold 21, the resin sheets 23, 33 and the foamed body 37 (more particularly, the connection portion 37c) are compressed to form the hinge portion 5. Portions compressed by the projections 35a, 35b at the tip of the ridge 35 become the hinges 5a, 5b, and a portion facing the groove 35c becomes the intermediate portion 5c. The skin material sheet 38 becomes the skin material 8. A portion outside the pinch-off portions 21b, 31b becomes a burr. After that, the molds 21, 31 are opened to take out the panel 1, and the burr is removed to obtain the panel 1 shown in FIG. 1.

Figure 10:
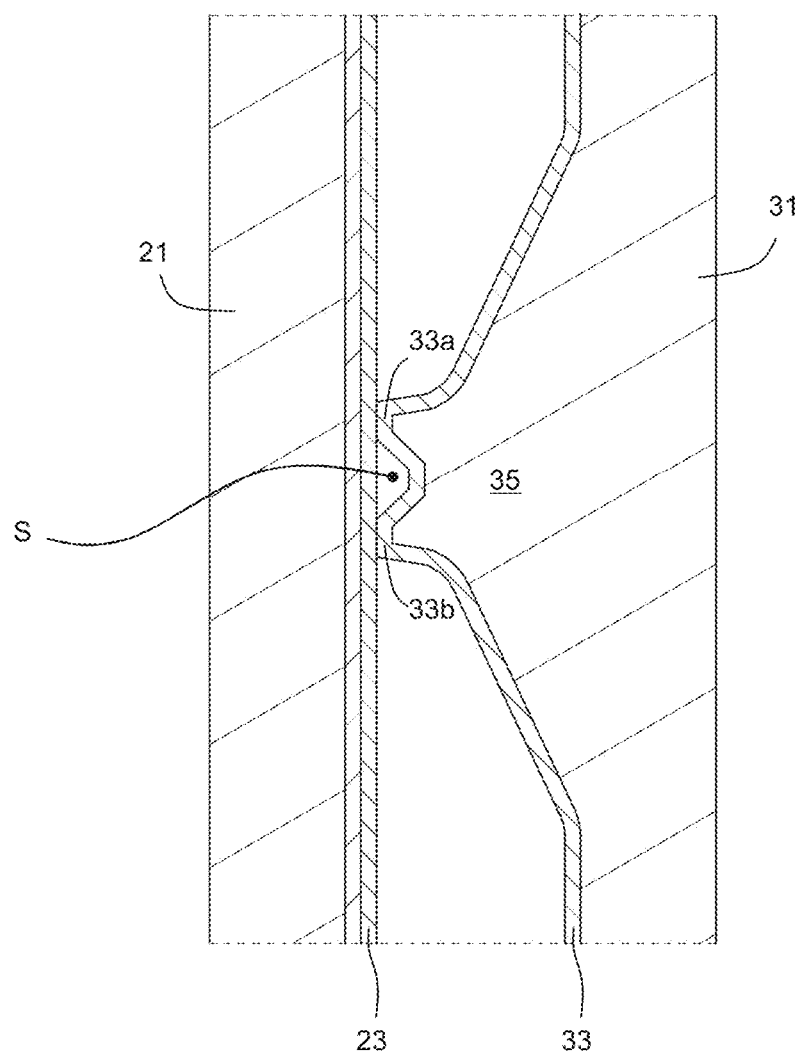
FIG. 10 shows a state immediately after the portions 33a, 33b come into contact with the resin sheet 23 in the middle of the mold closing step when the foamed body 37 is not provided between the resin sheets 23,33.
Figure 11:
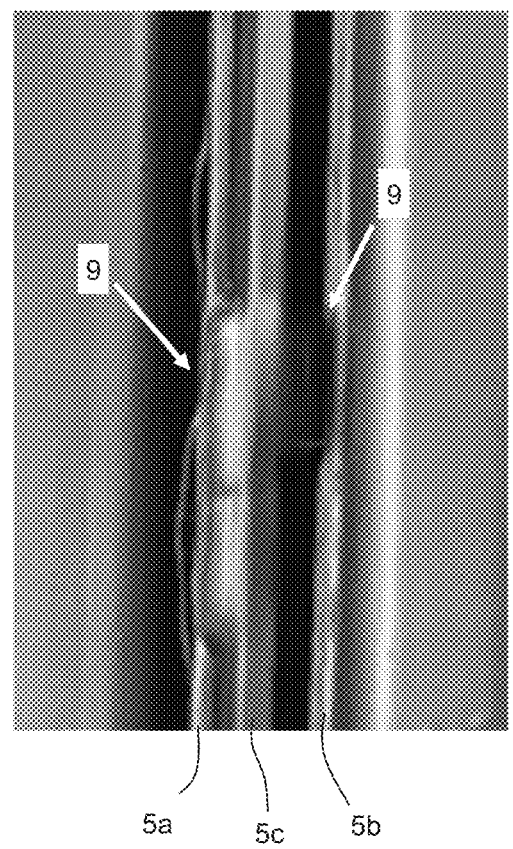
FIG. 11 is a photograph showing a state where a blister-shaped inflation portion 9 is formed at the boundary between an intermediate portion 5c and hinges 5a,5b.

For comparison, FIG. 10 shows a state immediately after the portions 33a, 33b come into contact with the resin sheet 23 in the middle of the mold closing step when the foamed body 37 is not provided between the resin sheets 23, 33. In such a case, since the foamed body 37 is not provided, the portions 33a, 33b come into contact with the resin sheet 23 to form the closed space S. When mold closing is further advanced in this state, the portions 33a, 33b and a portion of the resin sheet 23 facing the portions 33a, 33b are compressed by the projections 35a, 35b and the mold 21, and a portion of the resin sheet 23 facing the closed space S enters the closed space S and compresses air in the closed space S. Since air in the closed space S cannot escape through the resin sheets 23, 33, air in the closed space S is compressed as it is and remains as pressurized air in the intermediate portion 5c. Then, when the panel 1 is taken out from the molds 21, 31, a blister-shaped inflation portion 9 is formed at the boundary between the intermediate portion 5c and the hinges 5a, 5b due to the pressurized air in the intermediate portion 5c, as shown in FIG. 11. In the present embodiment, as described above, by arranging the foamed body 37 between the resin sheets 23, 33, it is possible to suppress the pressurized air from remaining in the intermediate portion 5c, thereby suppressing the formation of the inflation portion 9.

EXAMPLES

1. Manufacture of Panel 1

Example 1

According to the method described above, the panel 1 having the shape described in the above embodiment was manufactured. Detailed manufacturing conditions are as follows.
Thickness of the resin sheets 23, 33: 1 mm
Material of the resin sheets 23, 33: polypropylene 50 mass %, HDPE 30 mass %, talc 20 mass %
Width of the projections 35a, 35b: 1 mm
Depth of the groove 35c: 2 mm, width of the groove 35c: 6 mm
Thickness of the connection portion 37c of the foamed body 37: 4 mm
Material of the foamed body 37: PIOCELAN (manufactured by Sekisui Kasei Co., Ltd.), alloy of polyester and polystyrene
Expansion ratio of the foamed body 37: 35 times
Skin material sheet 38: Non-woven fabric with a thickness of 1 mm Comparative Example 1

The panel 1 was manufactured in the same manner as in Example 1, except that no foamed body was arranged between the resin sheets 23, 33.

Reference Example 1

The panel 1 was manufactured in the same manner as in Comparative Example 1, except that the projections 35a, 35b and the groove 35c were changed as follows.
Depth of the groove 35c: 1 mm, width of the groove 35c: 2 mm
2. Evaluation of Panel 1
When each of the panels 1 described above was visually observed to see if the inflation portion 9 was formed, no inflation portion 9 was formed in the panel 1 of Example 1. On the other hand, the inflation portions 9 as shown in FIG. 11 were formed in the panel of Comparative Example 1. This result shows that the formation of the inflation portion 9 can be suppressed by molding the panel 1 in the state where the foam 37 is arranged between the resin sheets 23 and 33.

Further, the inflation portion 9 was not formed in Reference Example 1. This result shows that the inflation portion 9 is not formed when the depth of the groove 35c is equal to or less than the thickness of the resin sheet 33 because the degree of pressurization of the air in the closed space S is small even if the air is pressurized. In other words, it can be said that the inflation portion 9 is formed only when the value of (depth of the groove 35c/thickness of the resin sheet 33) is within a specific range.

REFERENCE SIGNS LIST

1: panel, 2a: first main body portion, 2b: second main body portion, 3: front wall, 4: back wall, 4a: inclined portion, 5: hinge portion, 5a: first hinge, 5b: second hinge, intermediate portion, 6: peripheral wall, 7: foamed body, 8: skin material, 9: inflation portion, 10: molding machine, 11: raw resin, 12: hopper, 13: extruder, 13a: cylinder, 17: accumulator, 17a: cylinder, 17b: piston, 18: T-die, 20: resin sheet forming device, 21: first mold, 21a: cavity surface, 21b: pinch-off portion, 23: first resin sheet, 25: connecting pipe, 27: connecting pipe, 31: second mold, 31a: cavity surface, 31b: pinch-off portion, 33: second resin sheet, 33a: portion, 33b: portion, ridge, 35a: first projection, 35b: second projection, 35c: groove, 37: foamed body, 37a: first main body portion, 37b: second main body portion, 37c: connection portion, 38: skin material sheet, S: closed space

The invention claimed is:
1. A method for manufacturing a panel,
wherein the panel comprises first and second main body portions and a hinge portion,
the hinge portion comprises first and second hinges extending in parallel and an intermediate portion arranged therebetween,
the first main body portion and the intermediate portion are connected by the first hinge so as to be able to pivot relative to each other,
the second main body portion and the intermediate portion are connected by the second hinge so as to be able to pivot relative to each other,
the method comprises an extrusion step, a shaping step, an insertion step, and a mold closing step,
in the extrusion step, first and second resin sheets are extruded between first and second molds,
the second resin sheet is arranged between the first resin sheet and the second mold,
in the shaping step, the first and second resin sheets are shaped along a cavity surface of the first and second molds, respectively,
in the insertion step, an air-permeable foamed body is arranged between the first and second resin sheets,
in the mold closing step, the first and second molds are closed,
the second mold comprises a ridge for forming the hinge portion,
a tip of the ridge is provided with first and second projections corresponding to the first and second hinges, and a groove corresponding to the intermediate portion and arranged between the first and second projections, in the mold closing step, the hinge portion is formed by sandwiching and compressing the first and second resin sheets and the foamed body between the tip of the ridge and the first mold, a value of Dg/Ts2 is 1.5 to 3, where Dg represents a depth of the groove, and Ts2 represents a thickness of the second resin sheet, and a value of Tc/Ts2 is 2 to 6, where Tc represents a thickness of the foamed body at a portion facing the ridge.

2. The method of claim 1, wherein a value of Wg/Dg is 2.5 to 4, where Wg represents a width of the groove.

\* \* \* \* \*